United States Patent
Grosz et al.

(10) Patent No.: US 11,481,336 B2
(45) Date of Patent: Oct. 25, 2022

(54) HOST ASSISTED OPERATIONS IN MANAGED MEMORY DEVICES

(71) Applicant: Micron Technology, Inc., Boise, ID (US)

(72) Inventors: Nadav Grosz, Broomfield, CO (US); Jonathan Scott Parry, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 566 days.

(21) Appl. No.: 16/544,337

(22) Filed: Aug. 19, 2019

(65) Prior Publication Data

US 2021/0056044 A1 Feb. 25, 2021

(51) Int. Cl.
*G06F 21/14* (2013.01)
*G06F 12/14* (2006.01)
*G06F 21/78* (2013.01)
*G06F 12/02* (2006.01)

(52) U.S. Cl.
CPC ...... *G06F 12/1408* (2013.01); *G06F 12/0246* (2013.01); *G06F 21/78* (2013.01); *G06F 2212/7201* (2013.01)

(58) Field of Classification Search
CPC .. G06F 12/1408; G06F 12/0246; G06F 21/78; G06F 2212/7201; G06F 2212/7205; G06F 12/1009; Y02D 10/00
See application file for complete search history.

(56) References Cited

U.S. PATENT DOCUMENTS

| | | | | |
|---|---|---|---|---|
| 2005/0114610 | A1* | 5/2005 | Robinson | G06F 21/78 711/152 |
| 2014/0164677 | A1* | 6/2014 | Borchers | G06F 11/00 711/103 |
| 2015/0067245 | A1* | 3/2015 | Kruger | G06F 3/064 711/103 |
| 2015/0074329 | A1* | 3/2015 | Kondo | G06F 12/1408 711/163 |
| 2019/0102565 | A1* | 4/2019 | Boyd | G06F 3/0623 |
| 2019/0303006 | A1* | 10/2019 | Wozniak | G06F 3/067 |
| 2020/0034076 | A1* | 1/2020 | Zentz | G06F 3/0688 |
| 2022/0027233 | A1* | 1/2022 | Klein | G06F 3/0688 |
| 2022/0050741 | A1* | 2/2022 | Lee | G06F 3/0679 |
| 2022/0058138 | A1* | 2/2022 | Hanna | G06F 12/06 |

OTHER PUBLICATIONS

"JEDEC Standard Universal Flash Storage (UFS) Host Performance Booster(HPB) Extension", Version 1.0 JESD220-3, (2019), 34 pgs.

\* cited by examiner

*Primary Examiner* — Sanchit K Sarker
(74) *Attorney, Agent, or Firm* — Schwegman Lundberg & Woessner, P.A.

(57) ABSTRACT

Devices and techniques for efficient host assisted logical-to-physical (L2P) mapping are described herein. For example, a command can be executed that results in a change as to which physical address of a memory device corresponds to a logical address. The change can be obfuscated as part of an obfuscated L2P map for the memory device and written to storage on the memory device. The change can then be provided a host from the storage.

24 Claims, 9 Drawing Sheets

HOST ASSISTED OPERATIONS IN MANAGED MEMORY DEVICES

BACKGROUND

Memory devices are typically provided as internal, semiconductor, integrated circuits in computers or other electronic devices. There are many different types of memory, including volatile and non-volatile memory.

Volatile memory requires power to maintain its data, and includes random-access memory (RAM), dynamic random-access memory (DRAM), or synchronous dynamic random-access memory (SDRAM), among others.

Non-volatile memory can retain stored data when not powered, and includes flash memory, read-only memory (ROM), electrically erasable programmable ROM (EEPROM), static RAM (SRAM), erasable programmable ROM (EPROM), resistance variable memory, such as phase-change random-access memory (PCRAM), resistive random-access memory (RRAM), magnetoresistive random-access memory (MRAM), or 3D XPoint™ memory, among others.

Memory is typically described and organized by logical blocks that are virtual, and physical blocks. While physical blocks refer to (e.g., are addresses of) physical structures (e.g., locations) in the memory devices, logical blocks are conceptual analogues that provide flexible interfaces to the physical blocks. Thus, for example, if a memory device moves data from one physical block to another—for example to garbage collect the first physical block—a relationship from the first physical block to a corresponding logical block can be transferred without interrupting host operations that access the data via the logical block. The relationship between physical and logical blocks is generally maintained in a data structure, which may be referred to as a logical-to-physical (L2P) map (e.g., table, list, dictionary, or other data structure). As the physical structure of the memory device increases in size and complexity, often, so too does the L2P mapping. This may be an issue when memory device controllers have limited capacity to manage large L2P mappings.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

DETAILED DESCRIPTION

Figure 1:
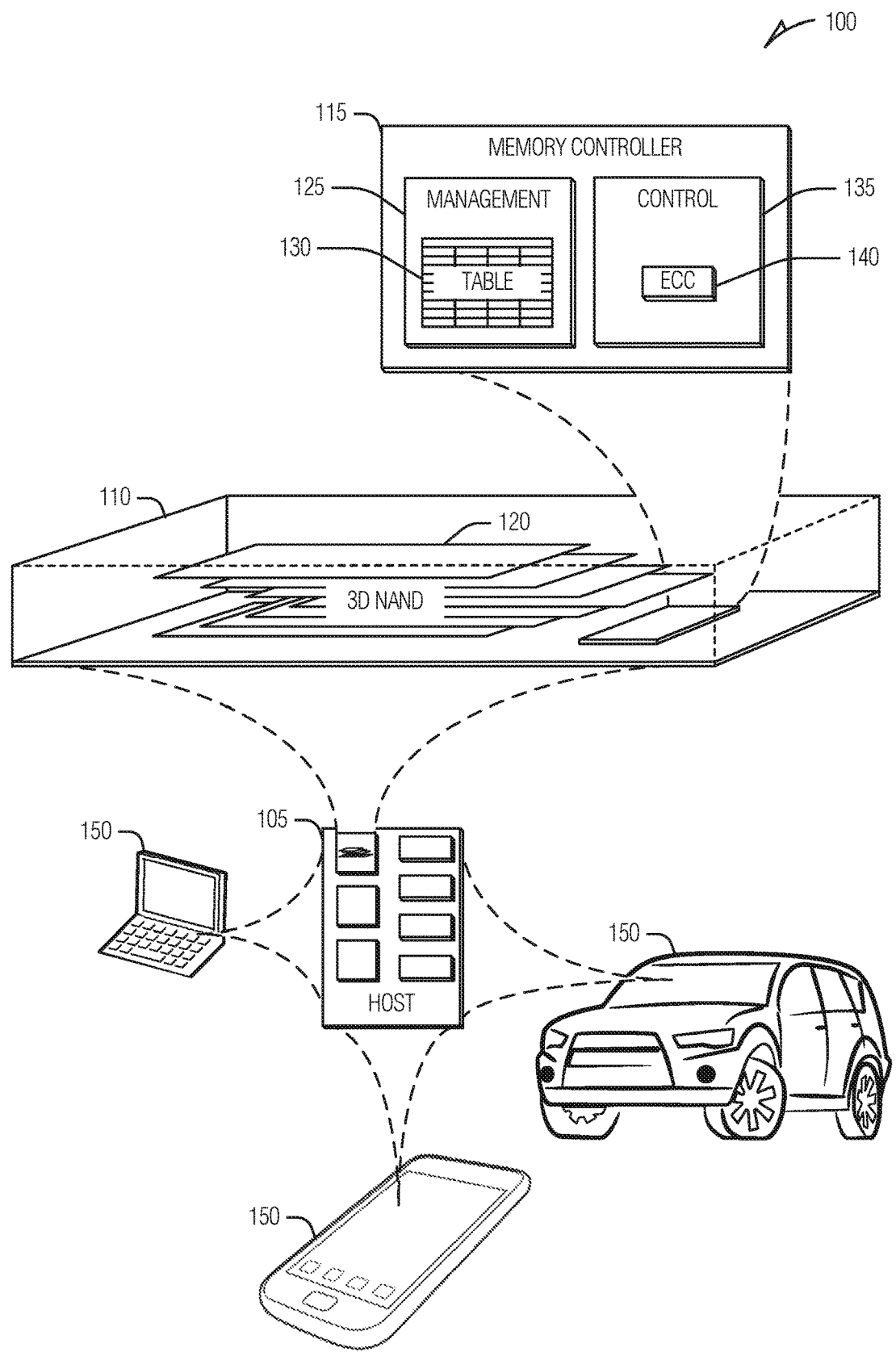
FIG. 1 illustrates an example of an environment including a memory device.

A technique to efficiently protect a memory device from host interefernce when sharing L2P mappings is described below. In the following examples, a host is enlisted to help manage L2P mappings for many memory device operations (e.g., a read, write, etc.). To enable host assistance, L2P mappings for the memory device are shared with the host. This, however, may lead to some security issues for the memory device. The devices, systems, and techniques described below address some of these concerns in a space and time efficient manner.

Memory devices include individual memory die, which may, for example, include including a storage region comprising one or more arrays of memory cells, implementing one (or more) selected storage technologies. Such memory die will often include support circuitry for operating the memory array(s). Other examples, sometimes known generally as "managed memory devices," include assemblies of one or more memory die associated with controller functionality configured to control operation of the one or more memory die. Such controller functionality can simplify interoperability with an external device, as a "host" as discussed later herein. In such managed memory devices the controller functionality may be implemented on one or more die also incorporating a memory array, or on a separate die). In other examples, one or more memory devices may be combined with controller functionality to form a solid-stage drive (SSD) storage volume.

Embodiments of the present disclosure are described in the example of managed memory devices implementing NAND flash memory cells, termed "managed NAND" devices. These examples, however, are not limiting on the scope of the disclosure, which may be implemented in other forms of memory devices and/or with other forms of storage technology.

Each flash memory cell in a NOR or NAND architecture semiconductor memory array can be programmed individually or collectively to one or a number of programmed states. For example, a single-level cell (SLC) can represent one of two programmed states (e.g., 1 or 0), representing one bit of data. Flash memory cells can also represent more than two programmed states, allowing the manufacture of higher density memories without increasing the number of memory cells, as each cell can represent more than one binary digit (e.g., more than one bit). Such cells can be referred to as multi-state memory cells, multi-digit cells, or multi-level cells (MLCs). In certain examples, MLC can refer to a memory cell that can store two bits of data per cell (e.g., one of four programmed states), a triple-level cell (TLC) can refer to a memory cell that can store three bits of data per cell (e.g., one of eight programmed states), and a quad-level cell (QLC) can store four bits of data per cell. MLC is used herein in its broader context, to refer to any memory cell(s) that can store more than one bit of data per cell (i.e., that can represent more than two programmed states).

Managed memory devices may be configured and operated in accordance with recognized industry standards. For example, managed NAND devices may be (as non-limiting examples), a Universal Flash Storage (UFS™) device, or an embedded MMC device (eMMC™), etc. For example, in the case of the above examples, UFS devices may be configured in accordance with Joint Electron Device Engineering Council (JEDEC) standards (e.g., JEDEC standard JESD223D, entitled JEDEC UFS Flash Storage 3.0, etc., and/or updates or subsequent versions to such standard. Similarly, identified eMMC devices may be configured in accordance with JEDEC standard JESD84-A51, entitled "JEDEC eMMC standard 5.1", again, and/or updates or subsequent versions to such standard.

An SSD can be used as, among other things, the main storage device of a computer, having advantages over traditional hard drives with moving parts with respect to, for example, performance, size, weight, ruggedness, operating temperature range, and power consumption. For example, SSDs can have reduced seek time, latency, or other delay associated with magnetic disk drives (e.g., electromechanical, etc.). SSDs use non-volatile memory cells, such as flash memory cells to obviate internal battery supply requirements, thus allowing the drive to be more versatile and compact. Managed memory devices, for example managed NAND devices, can be used as primary or ancillary memory in various forms of electronic devices, and are commonly used in mobile devices.

Both SSDs and managed memory devices can include a number of memory devices, including a number of dies or logical units (e.g., logical unit numbers or LUNs), and can include one or more processors or other controllers performing logic functions required to operate the memory devices or interface with external systems. Such SSDs and managed memory devices can include one or more flash memory die, including a number of memory arrays and peripheral circuitry thereon. The flash memory arrays can include a number of blocks of memory cells organized into a number of physical pages. In some examples, the SSDs can also include DRAM or SRAM (or other forms of memory die or other memory structures). Similarly, managed NAND devices can include one or more arrays of volatile and/or nonvolatile memory separate from the NAND storage array, and either within or separate from a controller. Both SSDs and managed NAND devices can receive commands from a host in association with memory operations, such as read or write operations to transfer data (e.g., user data and associated integrity data, such as error data and address data, etc.) between the memory devices and the host, or erase operations to erase data from the memory devices.

Many storage devices, such as flash devices, use translation tables to map logical elements (e.g., pages or blocks) to the physical equivalents of the logical elements. This allows the controller of the device to perform a variety of technique to increase the performance of, or longevity of, the storage elements of the device. For example, NAND flash cells experience physical wear with write or erase cycles. Further, these devices require many elements to be erased at one time (e.g., block erasure). To address these issues, the controller generally spreads writes around available cells (e.g., to reduce wearing out of these cells) and migrates good pages from blocks to erase the block and thus free additional space. In both cases, a host address for a given page or block can be constant even though the data to which it refers is moved to different physical pages or blocks by virtue of the translation table.

Translation tables are generally loaded into an internal memory of the controller. If the table size is greater than the internal memory (e.g., in random access memory (RAM), such as dynamic RAM (DRAM) or static RAM (SRAM) of the controller, a portion of the table is loaded into the internal memory and the remainder of the table is stored in other storage (such as NAND flash array elements). If a translation request (e.g., a logical-to-physical (L2P) mapping) is not in the internal memory, the controller replaces the internal memory portion of the table with the appropriate portion from other storage. This process can increase latencies when performing operations such as reading or writing to the storage device. Although increased internal memory can reduce these occurrences, this comes at a manufacturing and power cost that can be unacceptable for a given application.

To address the issue of swapping portions of the translation tables into and out of internal memory, the translation tables can be delivered to a host (with presumably greater memory resources than the storage device), allowing the host to indicate which physical address a given operation applies. This is referred to herein as host cached L2P mapping, though it can also be referred to as host performance booster (HPB), unified memory extension (UME), or host memory buffer (HMB) in some contexts. In these arrangements, the controller is ultimately responsible for maintaining the translation tables and updating the host with changes to the translation tables, but the host actually the controller with the physical addresses to be operated upon along with the traditional command and logical address. Because the physical address is provided by the host, the controller can avoid referencing the translation tables when performing an operation, increasing efficiency or decreasing latency when performing the operation. The physical address can be encapsulated into a payload (e.g., physical address payload). For example, HPB proposals, the payload is eight bytes, while the physical address is four bytes. The remaining four bytes of the payload can be used for other control purposes.

Current host cached L2P mapping proposals include several drawbacks. For example, the controller cannot control the host memory. Thus, manipulations of the L2P mappings by the host can circumvent data protection implemented by the controller. Here, malicious or defective software of the host can corrupt the data on the storage device in ways not possible when the controller relies solely on its internal translation tables.

Obfuscated L2P mappings—in which physical addresses provided to the host are encrypted, or otherwise protected from discovery by the controller—enable the controller to exploit the advantages of host cached L2P mapping while also validating data, preventing replay attacks, preventing unauthorized modification of the data, and possibly to protect proprietary operations of the storage device, such as wear leveling techniques. These goals are accomplished by computing a verification of a request using a logical and physical address pair from the request. This verification can be checked against a stored version of the verification to determine whether the verification passes. For example, when a write is performed, the controller will have a L2P map. The controller can hash the logical address and the physical address and store the result. On a subsequent read of the written data, the host provides the logical and physical address from the translation table copy held by the host. The controller can hash the provided logical and physical address to produce a test hash, read the hash stored when the write was performed, and verify that the request is correct when the hashes match. If the hashes do not match, the controller can use the internal translation tables to lookup the correct physical address to the provided logical address and provide the correct data. Thus, the controller implements the performance enhancement of host cached L2P mapping when the provided L2P pair is correct, and gracefully falls back on the traditional translation table lookup when there is a problem (e.g., via mistake or maliciousness).

Additional information can be applied to the verification to provide additional functionality. For example, a sequence number can be hashed with the L2P mapping to prevent replay attacks. Moreover, the actual physical address can themselves be obfuscated such that the host provides the obfuscated physical address from the translation table provided by the controller. The controller de-obfuscates the physical address to ascertain the actual physical address without reference to the translation tables. In this manner, the controller can protect the internal operation of the L2P mapping from the host to secure proprietary techniques while still enjoying the enhanced performance of host cached L2P mapping.

An improvement to the obfuscated host-cached L2P mapping described above includes pre-obfuscating regions of the L2P map table prior to request by the host. Obfuscating the L2P table regions upon request by the host can increase processing time and impact user experience. Because managed memory memory devices typically have limited power and die space for processing (e.g., an encryption engine), but large available storage (e.g., in a non-volatile array such as a NAND array), an opportunity to time-shift obfuscation processing to a period in which such processing will reduce the impact on the user experience. Additional details and examples are provided below.

Devices employing the translation table modifications discussed herein can fit in many applications. Electronic devices, such as mobile electronic devices (e.g., smart phones, tablets, etc.), electronic devices for use in automotive applications (e.g., automotive sensors, control units, driver-assistance systems, passenger safety or comfort systems, etc.), and internet-connected appliances or devices (e.g., internet-of-things (IoT) devices, etc.), have varying storage needs depending on, among other things, the type of electronic device, use environment, performance expectations, etc.

Electronic devices can be broken down into several main components: a processor (e.g., a central processing unit (CPU) or other main processor); memory (e.g., one or more volatile or non-volatile RAM memory device, such as DRAM, mobile or low-power double-data-rate synchronous DRAM (DDR SDRAM), etc.); and a storage device (e.g., non-volatile memory (NVM) device, such as flash memory, read-only memory (ROM), an SSD, an MMC, or other memory card structure or assembly, etc.). In certain examples, electronic devices can include a user interface (e.g., a display, touch-screen, keyboard, one or more buttons, etc.), a graphics processing unit (GPU), a power management circuit, a baseband processor or one or more transceiver circuits, etc.

FIG. 1 illustrates an example of an environment 100 including a host device 105 and a memory device 110 configured to communicate over a communication interface. The host device 105 or the memory device 110 can be included in a variety of products 150, such as Internet of Things (IoT) devices (e.g., a refrigerator or other appliance, sensor, motor or actuator, mobile communication device, automobile, drone, etc.) to support processing, communications, or control of the product 150.

The memory device 110 includes a memory controller 115 and a memory array 120 including, for example, a number of individual memory die (e.g., a stack of three-dimensional (3D) NAND die). In 3D architecture semiconductor memory technology, vertical structures are stacked, increasing the number of tiers, physical pages, and accordingly, the density of a memory device (e.g., a storage device). In an example, the memory device 110 can be a discrete memory or storage device component of the host device 105. In other examples, the memory device 110 can be a portion of an integrated circuit (e.g., system on a chip (SOC), etc.), stacked or otherwise included with one or more other components of the host device 105.

One or more communication interfaces can be used to transfer data between the memory device 110 and one or more other components of the host device 105, such as a Serial Advanced Technology Attachment (SATA) interface, a Peripheral Component Interconnect Express (PCIe) interface, a Universal Serial Bus (USB) interface, a UFS interface, an eMMC™ interface, or one or more other connectors or interfaces. The host device 105 can include a host system, an electronic device, a processor, a memory card reader, or one or more other electronic devices external to the memory device 110. In some examples, the host 105 can be a machine having some portion, or all, of the components discussed in reference to the machine 900 of FIG. 9.

The memory controller 115 can receive instructions from the host 105, and can communicate with the memory array 120, such as to transfer data to (e.g., write or erase) or from (e.g., read) one or more of the memory cells, planes, sub-blocks, blocks, or pages of the memory array 120. The memory controller 115 can include, among other things, circuitry or firmware, including one or more components or integrated circuits. For example, the memory controller 115 can include one or more memory control units, circuits, or components configured to control access across the memory array 120 and to provide a translation layer between the host 105 and the memory device 110.

With respect to translation, the memory controller 115 can implement a technique for efficient obfuscated L2P mapping in host-cached L2P. At the highest level, the memory controller 115 pre-computes L2P table obfuscations prior before events that trigger an update to the host 105 L2P table. Such events can include a request by the host 105 to refresh an L2P table region, or an automatic update being delivered by the controller 115, for example as a result of the controller 115 executing a command that results in a change as to which physical address of the NAND array 120 corresponds to a logical address. Any command that updates a logical block, or moves the logical block (e.g., via wear leveling or garbage collection) generally results in a change to the physical address.

Thus, the controller 115 is arranged to obfuscate the change as part of an obfuscated L2P table for the memory device 110. In an example, obfuscating the change includes updating a sub-region of a region of the obfuscated L2P table with the change and then re-obfuscating the sub-region. Such incremental updates to the region can enable selective processing of only those elements of the L2P mapping that provide the greatest impact on host-cached L2P operations. In an example, a region is a segment of the obfuscated L2P table which the host can request in accordance with a communication protocol between the host and the memory device. Thus, the size of the region is based on the communications protocol, such as UFS.

As noted above, the obfuscation results in an inability for the host 105 to map the physical blocks of the NAND array 120. Thus, for example, the obfuscation can be encryption. The obfuscation can also include other features that the memory controller 115 can use to implement data integrity (e.g., error correction codes (ECC)), or prevent replay attacks (e.g., a freshness value).

The obfuscation can be implemented by a dedicated hardware component on the controller 115. Such a component can implement an encryption technique, such as skipjack or blowfish, or other block-level encoder. In an example, the block is eight bytes. In an example, the block is sixteen bytes. In an example, sub-regions of a region are sized to match the block size of the obfuscation component.

In an example, obfuscation of the change (operation 810) is performed in response to an idle period of the memory memory device. Here, an idle period is defined by a workload of the memory device 110, for example, as measured by a command queue. When the workload falls below a threshold—e.g., the number of commands or the rate of arrival of commands in the command queue is below the threshold—the memory device 110 is idle. Using the idle period to pre-compute obfuscated L2P table updates avoids impacts to the user experience when using the memory device 110.

In an example, obfuscation of the change is performed in response to the change resulting in a sub-region of the obfuscated L2P table exceeding a threshold of changes. Here, a delay is introduced in which not every change to the sub-region results in refreshing the corresponding obfuscated L2P mapping. Thus, changes can accumulate until the threshold is reached. This can increase efficiency by enabling fewer L2P table obfuscations for a similar synchronicity between the obfuscated L2P mapping and the actual logical to physical address mappings. In an example, the method 800 is extended to include maintaining a map of valid or dirty bits to track changes to the sub-region. This map enables the memory controller 115 to evaluate metrics on how "dirty" the sub-region is. These metrics can then be used to prioritize sub-regions for updates during idle periods. By processing the dirtiest sub-regions first, the memory controller 115 can achieve the greatest impact in terms of keeping the obfuscated L2P regions up-to-date with the idle time it has.

The memory controller 115 is arranged to write the change to storage on the memory device 110, such as the NAND array 120. This storage is not to be confused with SRAM or DRAM working memory of the controller 115. The stored copy of the updated obfuscation of the change is cached for future use.

The memory controller 115 is arranged to provide the change to the host 105 from the storage. Here, instead of obfuscating the L2P table region on-the-fly as was previously done, the memory controller 115 simply reads the pre-computed obfuscated region from the storage. In an example, the memory controller 115 is arranged to provide the change to the host 105 in response to a request from the host 105 for L2P mappings. In an example, the controller 115 is arranged to provide the change to the host 105 in response to the host 105 establishing communications with the memory device 105 following a power-up of the host 105. This on-boot facility can greatly increase power-on responsiveness for the host 150, enabling more aggressive power-savings techniques for the host 105 without impacting user experience.

Although the examples above are in the context of the memory controller 115 maintaining both a plaintext version of L2P mappings and an obfuscated version of L2P mappings in storage, another possibility exists; storing only an obfuscated version of the L2P mappings. As noted above, and illustrated in FIGS. 2 and 3 below, the memory controller 115 can generally not hold all the L2P mappings in its working memory. Rather, the memory controller 115 swaps portions of the L2P mapping table into the working (e.g., volatile) memory from the storage to perform an operation—such as reading, writing, wear leveling, garbage collection, etc.

Instead of performing the L2P region swapping on a plaintext version of the L2P mappings, the memory controller 115, in an example, is arranged to de-obfuscate (e.g., decrypt) an obfuscated version of the L2P mapping during the swap procedure. This enables the memory controller 115 to maintain a single L2P mapping in the storage while still providing the efficiency of pre-computed obfuscated L2P table regions to the host 105. Thus, the memory device 110 does not maintain a de-obfuscated version of the L2P table in the storage. By replacing the plaintext version of the L2P mappings in the storage, a reduction in storage is achieved while still providing the benefit of pre-computed obfuscated L2P table regions. Further, because the obfuscated L2P table is used directly by the memory controller 115, the obfuscated L2P mappings will be up-to-date without additional work by the memory controller 115 to synchronize a plaintext L2P table and an obfuscated L2P table.

Several benefits can accrue to the memory controller 115 arrangement described above. Some of these benefits include security, latency reduction, power savings, and host boot times. With respect to security, host L2P data could be tampered with, allowing an attacker to access data that does not belong to its assigned logical address. When the memory device 110 stores only the obfuscated L2P map in the NAND array 120, there are greater obstacles for the attacker to access protected physical locations.

With respect to throughput, latency, or quality-of-service (OOS), the host 105 can request many L2P maps without stalling, waiting for on-the-fly obfuscation to catch up. Rather, the cached versions of the obfuscated regions can be served to the host 105 as fast as any read. This efficiency can result in time savings of one to four milliseconds, or more.

With respect to power savings, many regions of the storage can be mostly read-only. To save power, the host 105 or the memory device 110 can enter a reduced power state (e.g., go to sleep) frequently. Such reduced power states generally result in the host 105 losing its copy of the L2P mapping, which, as noted above, is ameliorated by simply reading the cached copy from storage.

The memory manager 125 can include, among other things, circuitry or firmware, such as several components or integrated circuits associated with various memory management functions. For purposes of the present description example memory operation and management functions will be described in the context of NAND memory. Persons skilled in the art will recognize that other forms of non-volatile memory can have analogous memory operations or management functions. Such NAND management functions include wear leveling (e.g., garbage collection or reclamation), error detection or correction, block retirement, or one or more other memory management functions. The memory manager 125 can parse or format host commands (e.g., commands received from a host) into device commands (e.g., commands associated with operation of a memory array, etc.), or generate device commands (e.g., to accomplish various memory management functions) for the array controller 135 or one or more other components of the memory device 110.

The memory manager 125 can include a set of management tables 130 configured to maintain various information associated with one or more component of the memory device 110 (e.g., various information associated with a memory array or one or more memory cells coupled to the memory controller 115). For example, the management tables 130 can include information regarding block age, block erase count, error history, or one or more error counts (e.g., a write operation error count, a read bit error count, a read operation error count, an erase error count, etc.) for one or more blocks of memory cells coupled to the memory controller 115. In certain examples, if the number of detected errors for one or more of the error counts is above a threshold, the bit error can be referred to as an uncorrectable bit error. The management tables 130 can maintain a count of correctable or uncorrectable bit errors, among other things. In an example, the management tables 103 can include translation tables or a L2P mapping.

The array controller 135 can include, among other things, circuitry or components configured to control memory operations associated with writing data to, reading data from, or erasing one or more memory cells of the memory device 110 coupled to the memory controller 115. The memory operations can be based on, for example, host commands received from the host 105, or internally generated by the memory manager 125 (e.g., in association with wear leveling, error detection or correction, etc.).

The array controller 135 can include an error correction code (ECC) component 140, which can include, among other things, an ECC engine or other circuitry configured to detect or correct errors associated with writing data to or reading data from one or more memory cells of the memory device 110 coupled to the memory controller 115. The memory controller 115 can be configured to actively detect and recover from error occurrences (e.g., bit errors, operation errors, etc.) associated with various operations or storage of data, while maintaining integrity of the data transferred between the host 105 and the memory device 110, or maintaining integrity of stored data (e.g., using redundant RAID storage, etc.), and can remove (e.g., retire) failing memory resources (e.g., memory cells, memory arrays, pages, blocks, etc.) to prevent future errors.

The memory array 120 can include several memory cells arranged in, for example, a number of devices, planes, sub-blocks, blocks, or pages. As one example, a 48 GB TLC NAND memory device can include 18,592 bytes (B) of data per page (16,384+2208 bytes), 1536 pages per block, 548 blocks per plane, and 4 or more planes per device. As another example, a 32 GB MLC memory device (storing two bits of data per cell (i.e., 4 programmable states)) can include 18,592 bytes (B) of data per page (16,384+2208 bytes), 1024 pages per block, 548 blocks per plane, and 4 planes per device, but with half the required write time and twice the program/erase (PIE) cycles as a corresponding TLC memory device. Other examples can include other numbers or arrangements. In some examples, a memory device, or a portion thereof, can be selectively operated in SLC mode, or in a desired MLC mode (such as TLC, QLC, etc.).

In operation, data is typically written to or read from the NAND memory device 110 in pages, and erased in blocks. However, one or more memory operations (e.g., read, write, erase, etc.) can be performed on larger or smaller groups of memory cells, as desired. The data transfer size of a NAND memory device 110 is typically referred to as a page, whereas the data transfer size of a host is typically referred to as a sector.

Although a page of data can include a number of bytes of user data (e.g., a data payload including a number of sectors of data) and its corresponding metadata, the size of the page often refers only to the number of bytes used to store the user data. As an example, a page of data having a page size of 4 KB can include 4 KB of user data (e.g., 8 sectors assuming a sector size of 512 B) as well as a number of bytes (e.g., 32 B, 54 B, 224 B, etc.) of metadata corresponding to the user data, such as integrity data (e.g., error detecting or correcting code data), address data (e.g., logical address data, etc.), or other metadata associated with the user data.

Different types of memory cells or memory arrays 120 can provide for different page sizes, or can require different amounts of metadata associated therewith. For example, different memory device types can have different bit error rates, which can lead to different amounts of metadata necessary to ensure integrity of the page of data (e.g., a memory device with a higher bit error rate can require more bytes of error correction code data than a memory device with a lower bit error rate). As an example, a multi-level cell (MLC) NAND flash device can have a higher bit error rate than a corresponding single-level cell (SLC) NAND flash device. As such, the MLC device can require more metadata bytes for error data than the corresponding SLC device.

Figure 2:
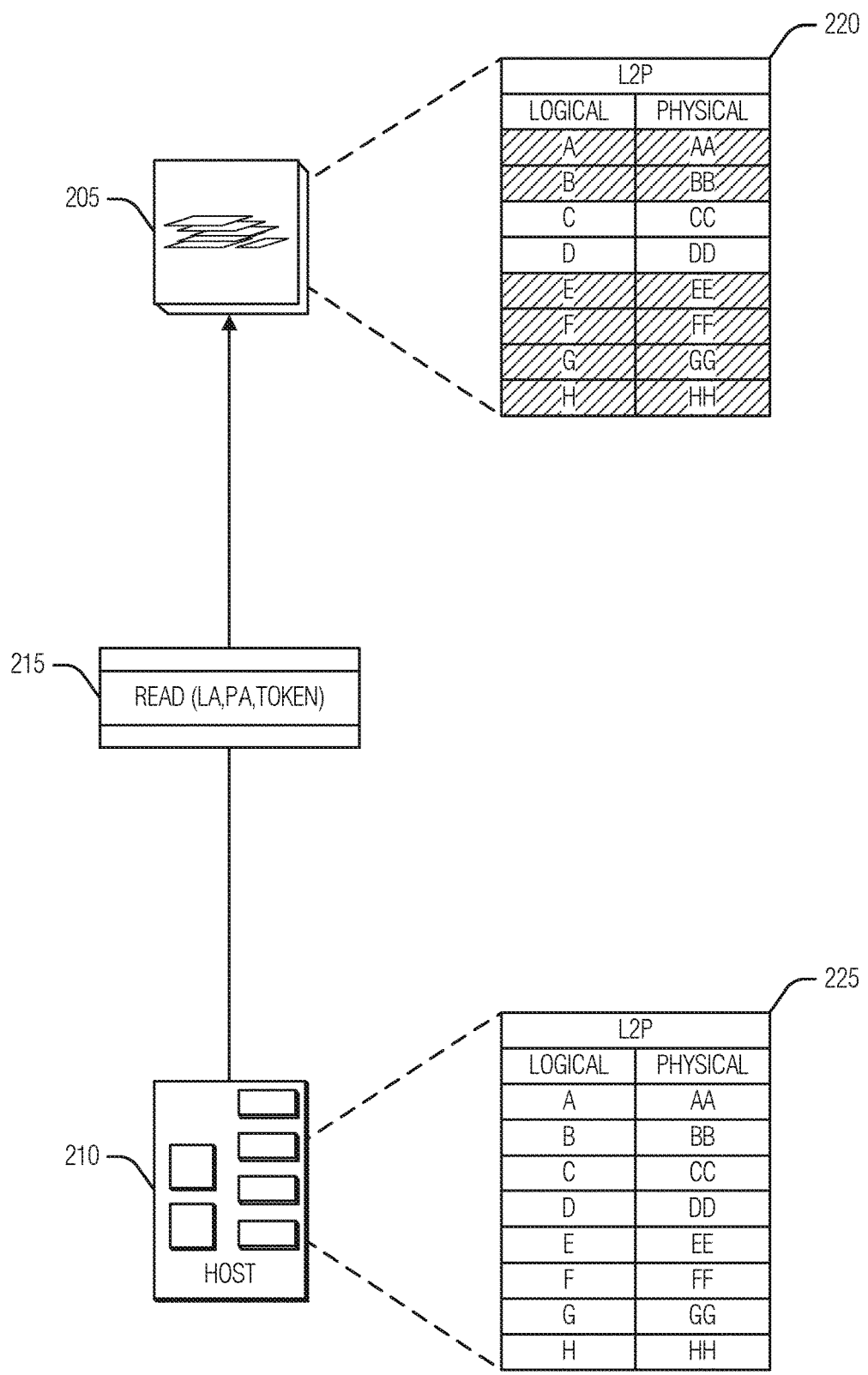
FIG. 2 illustrates an example of performing a read request with a host cached logical-to-physical table.

FIG. 2 illustrates an example of performing a read request with a host cached L2P table 225. The host 210 may operate as the host 105 described above with respect to FIG. 1, and the memory device 205 may operate as the memory device 110 also described above with respect to FIG. 1. As illustrated, the host 210 includes a completely available copy of the translation table 225 for L2P mapping. The memory device 205 includes the same translation table 220, except that only a portion of the translation table 220 is available to the memory device 205. The shaded mappings of the translation table 220 are not presently available to (e.g., loaded into the RAM of) the memory device 110, but are stored in slower storage (e.g., NAND cells) of the memory device 205.

As illustrated, the host 210 is making a read request 215 that includes both a logical address (LA) and a physical address (PA), which was determined by reference to the translation table 225. The token can be used to verify the correctness of the request 215. In the illustrated example, the memory device 205 uses the information in the read request to verify the correctness of the request—e.g., that the LA and PA match, that the token matches a token stored with the PA, or both—and perform the read without referencing the translation table 220. In this scenario, if the read was for logical address 'A', the above operations would reduce processing in performing the read because the memory device 205 would not have to load the shaded portion of translation table 220 into working memory (e.g., RAM) in order to determine that data at physical address 'AA' was being read. In an example, the memory device 205 includes a map that indicates whether the host's L2P table is current. If the map indicates that the host L2P table is not current—such as the L2P table of the memory device 205 has been changed since the last time the host received the L2P table—then the memory device can skip the verification, and simply lookup the PA using the L2P table. This prevents additional verification processing, and possible errors, when the currency of the host's information cannot be trusted.

Figure 3:
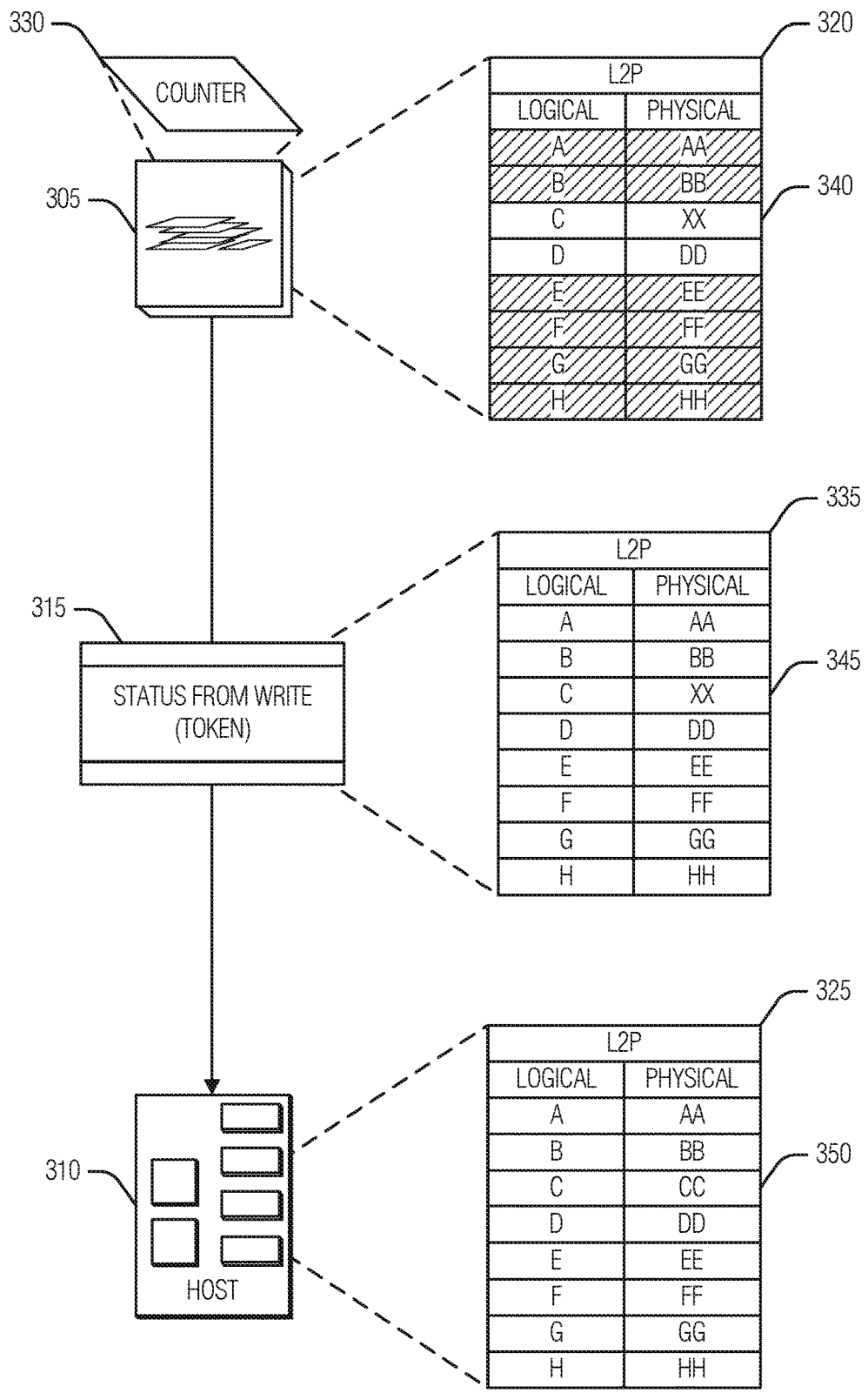
FIG. 3 illustrates an example of performing a write request and refreshing physical addresses.

FIG. 3 illustrates an example of performing a write request and refreshing physical addresses. The host 210 may operate as the host 105 or the host 210 respectively described above with respect to FIGS. 1 and 2, and the memory device 305 may operate as the memory device 110 or the memory device 205 also respectively described above with respect to FIGS. 1 and 2. Here, the memory device 305 has updated the physical address of logical address 'C' to 'XX'. This change is reflected in translation table 320 at element 340. However, the corresponding element 350 of translation table 325 held by the host 310 does not yet reflect the correct mapping (e.g., the translation table 325 is stale). To correct this, the memory device 305 provides a duplicate translation table 335 with the corrected entry 345 to the host 310 via a status message 315 produced in response to the write request. The host 310 can then update its translation table 325 for future requests. Due to the often-limited space in a status message (e.g., only one or two updates can be submitted in some status messages), the status can be queued and delivered at each communication that has space for a status message. For example, on an error free completion of a command, the status data is often not used, and thus can carry an update status message to the host.

As noted above, the memory device 305 can generate a token that corresponds to the updated entry 340. This token is also transmitted in the status request when, for example, it is not included in the translation table 335. In an example, a counter 330 of the memory device 305 is used in generating the token. As noted above, this can defend against replay attacks of the token scheme.

Also as noted above, the map can be used to directly determine whether a traditional L2P table lookup should be used because the host's mapping information is not current.

Figure 4:
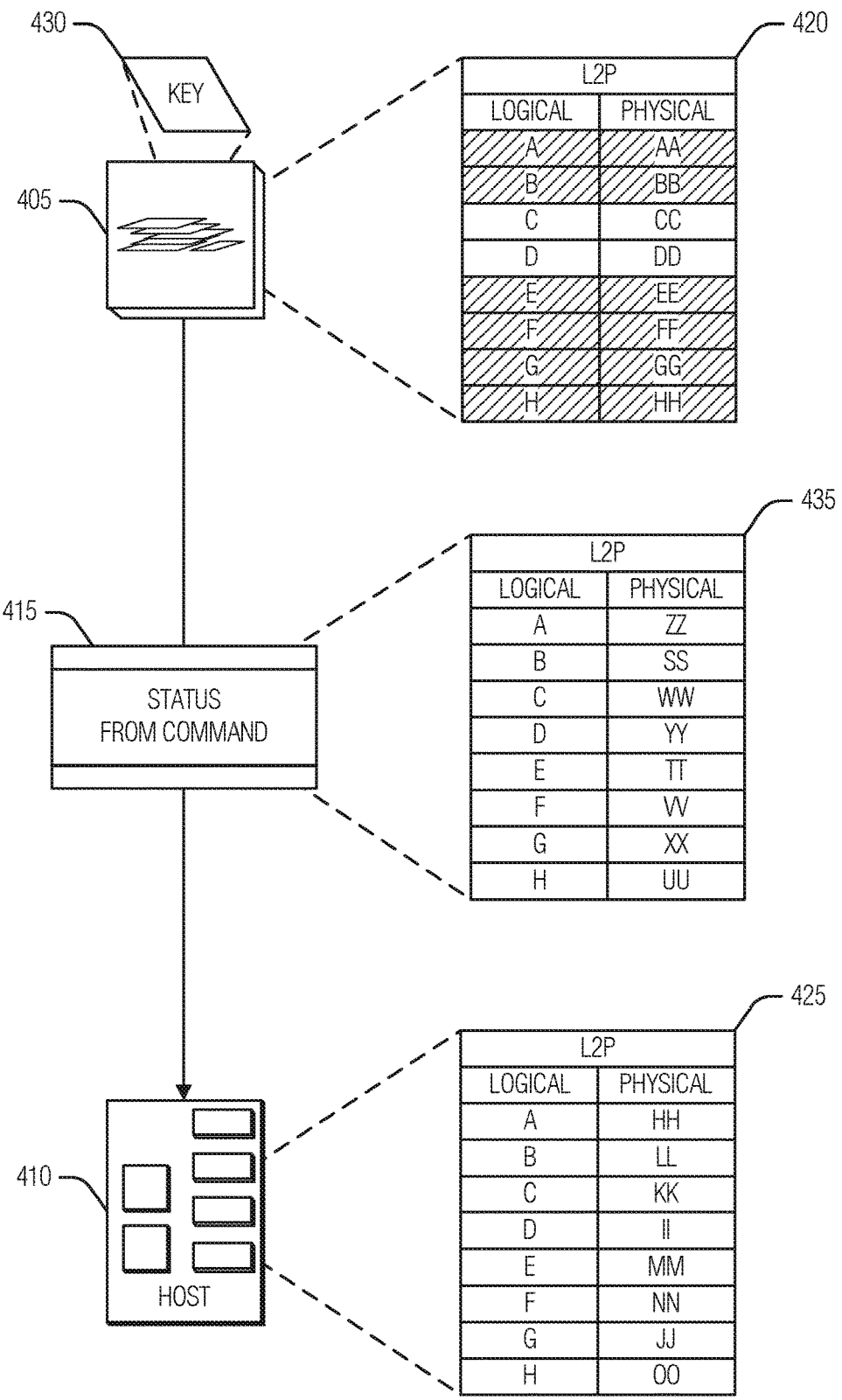
FIG. 4 illustrates an example of obfuscating physical addresses.

FIG. 4 illustrates an example of obfuscating physical addresses. The host 410 may operate as the host 105, the host 210, or the host 310 respectively described above with respect to FIGS. 1-3, and the memory device 405 may operate as the memory device 110, the memory device 205, or the memory device 305 also respectively described above with respect to FIGS. 1-3. Here, the translation table 420 of the memory device 405 includes internal physical address to logical address mappings and the translation table 425 of the host 410 includes external physical address to the same logical address mappings. The memory device 405 communicates the external physical address mappings via in the table 435 via a status message 415 or other memory device-to-host 410 communication. As noted above, to avoid lookups to the local translation table 420, the external physical addresses can be used by the memory device 405 to directly derive the internal physical addresses. A technique to accomplish this direct derivation is to symmetrically encrypt the internal physical addresses of the table 420 with a key 430 held by the memory device 405. The encrypted addresses are communicated to the host 410 in the update table 435. The host 410 never decrypts the external physical addresses, but rather uses them in accordance with a host-cached L2P mapping technique to indicate to which physical address an operation pertains. The memory device 405 then uses the key 430 to decrypt the external physical address in a request (e.g., a read or write request), the decrypted form of the external physical address being the internal physical address. As noted above, encrypting the entire physical address payload (e.g., physical address and control data) can provide a better result. This can occur because many secure cryptographic techniques have a minimum eight-byte block size.

This technique can be augmented with a seed, different key, etc., over time to provide different external addresses for the same internal physical address. If the internal derivation elements (e.g., the key, sequence number, random seed, etc.) are synchronized with the host translation table 425, the memory device 405 can directly derive the internal physical addresses from the external physical addresses provided by the host 405. Thus, as illustrated, the internal physical address for logical address 'C' in the table 420 is 'CC'. A previous encryption of the address 'CC' yielded 'KK' as shown for logical address 'C' in table 425. However, a change in the derivation elements (e.g., a changed key, new seed, etc.) has now caused 'CC' to encrypt to 'WW' for logical element 'C', which is being communicated to the host 405 in the status message 415 in table 435. Once received, the table 435 will be used by the host 405 to update its own table 425 for future requests.

Figure 5:
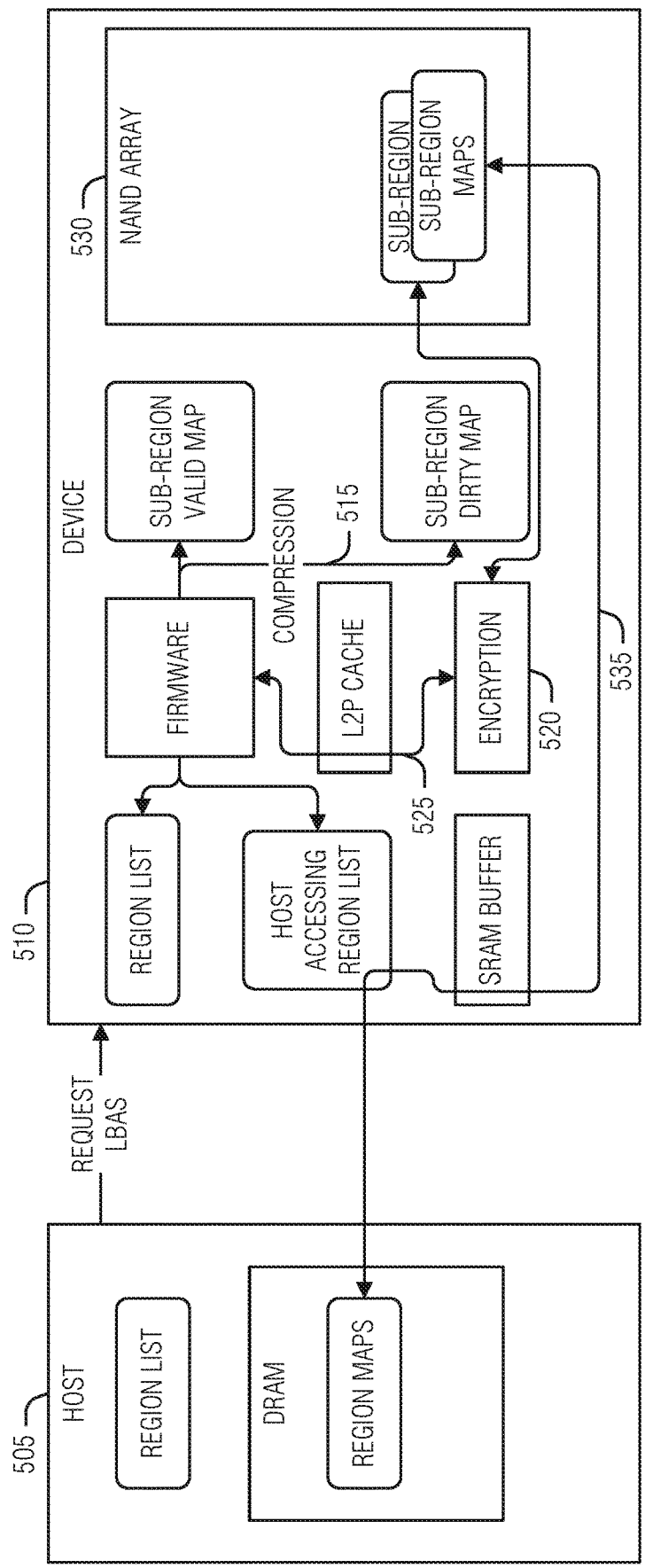
FIG. 5 illustrates a data flow through an example of a system for efficient obfuscated logical-to-physical mapping.

FIG. 5 illustrates a data flow through an example of a system for efficient obfuscated logical-to-physical mapping. The host 505 may operate as the host 105, the host 210, the host 310, or the host 410 respectively described above with respect to FIGS. 1-4, and the memory device 510 may operate as the memory device 110, the memory device 205, the memory device 305, or the memory device 405 also respectively described above with respect to FIGS. 1-4. As illustrated, the host 505 has a DRAM buffer to host L2P region maps. The use of DRAM is not necessary, but rather likely due to acceptable performance of DRAM and its reduced cost when compared to SRAM or the like. When the host 505 requests logical block addresses (LBAs) from the memory device 510, the memory device 510 consults the region list and the regions already checked out by the host. This information is used to update the sub-region valid and dirty maps (data path 515), which can later be used to update obfuscated versions of the L2P mappings. The data path 525 illustrates the memory device 510 using the encryption block 520 to obfuscate at least a sub-region of the L2P mappings from the L2P cache and store the result in the NAND array 530.

As noted with respect to FIG. 1, the memory device can be configured to store only an obfuscated version of the sub-region L2P maps in the NAND array 530. Here, the encryption block 520 provides a de-obfuscation facility to load the L2P cache with a plaintext version of the sub-region being used by the firmware.

Performing the obfuscation on segments of the L2P mappings that match the encryption component 520 enables the obfuscation of the L2P mappings to suspend and resume as needed. Using the valid and dirty maps, the memory device 510 can prioritize which segments to work on, providing a greater impact to host 505 efficiency by keeping the regions maps of the host current. The data flow 535 illustrates the path by which the original host 505 request for LBAs is satisfied from the NAND array 530.

Using the technique described herein, several benefits accrue. For example, security of the memory device 510 increases when, for example, the L2P mappings are stored in an obfuscated form. Further, lower latency in providing L2P maps to the host 505 is achieved via the pre-computation and caching of the obfuscated L2P maps in the NAND array 530. Faster boot times for the host 505 can also be achieved by sending the pre-computed obfuscated maps to the host from the NAND array 530.

The host 505 can also benefit by devoting less DRAM to the L2P mappings because the obfuscated L2P are delivered faster to the host 505 from the memory device 510.

Figure 6:
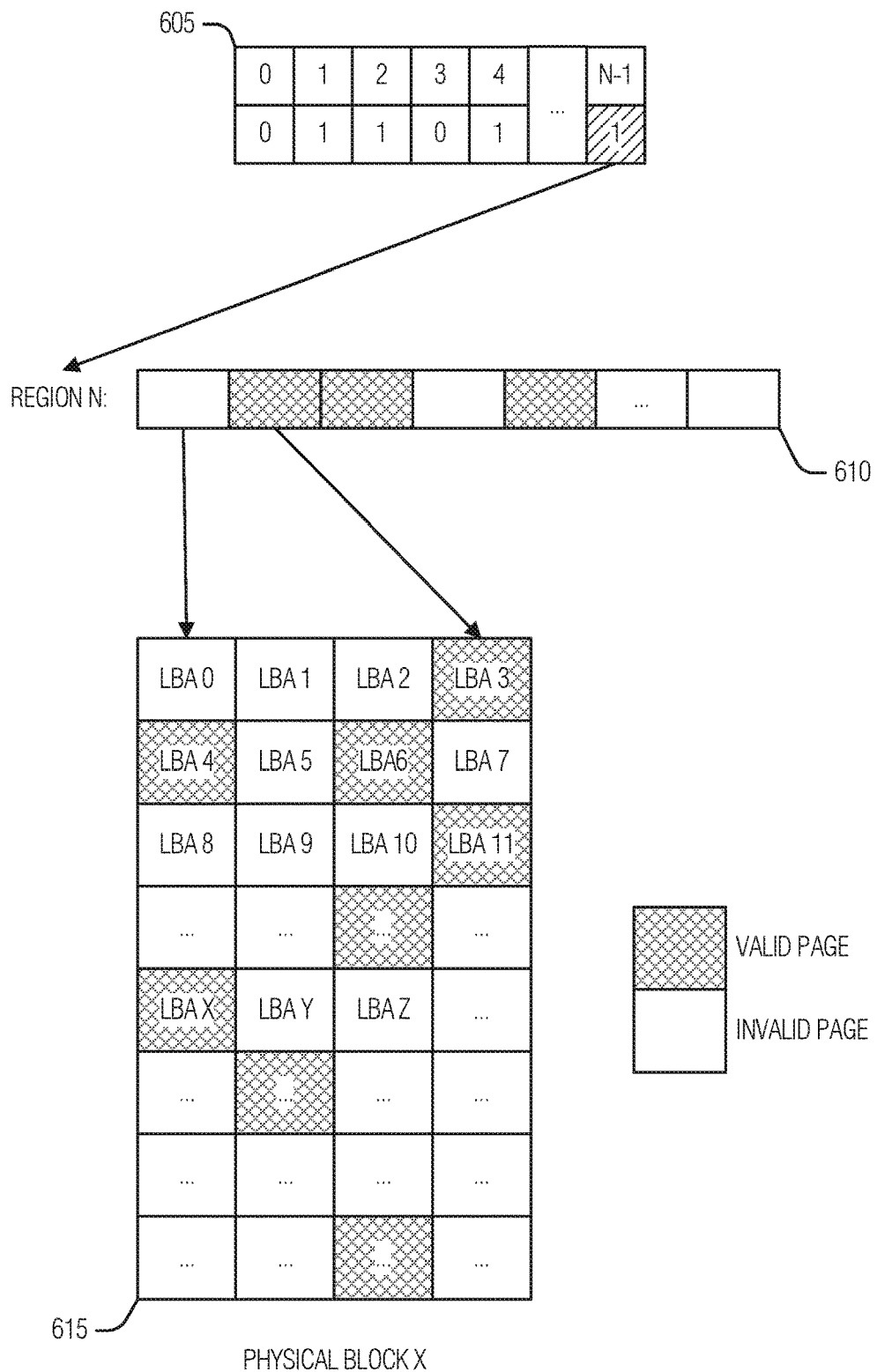
FIG. 6 illustrates an example of a host cached logical-to-physical table map.

FIG. 6 illustrates an example of a host L2P table map 605. The map 605 has entries that include a group identification (e.g., the boxes on top) and a currency indication (the boxes on the bottom). When implemented as a bitmap (as shown) the index of the bit is the group identifier and the bit indicates whether the group is current. In an example, a zero indicates currency while a one indicates that the group is not current. The group, or region 610, refers to a set of logical addresses, for example on a physical block 615. As illustrated, some of the logical addresses are still current (e.g., point to a valid page) while others have changed (e.g., they pointed to a valid page at one time, but now that page is no longer valid for that logical address). Thus, the host's L2P table is not current. If any logical address in the region 610 is not current in the host's L2P table, then the entire region is marked as not current. Different region delineations can be used in different examples. In an example, each region corresponds to a single logical address. In an example, each region corresponds to multiple (e.g., four) logical address that are not on the same block.

Figure 7:
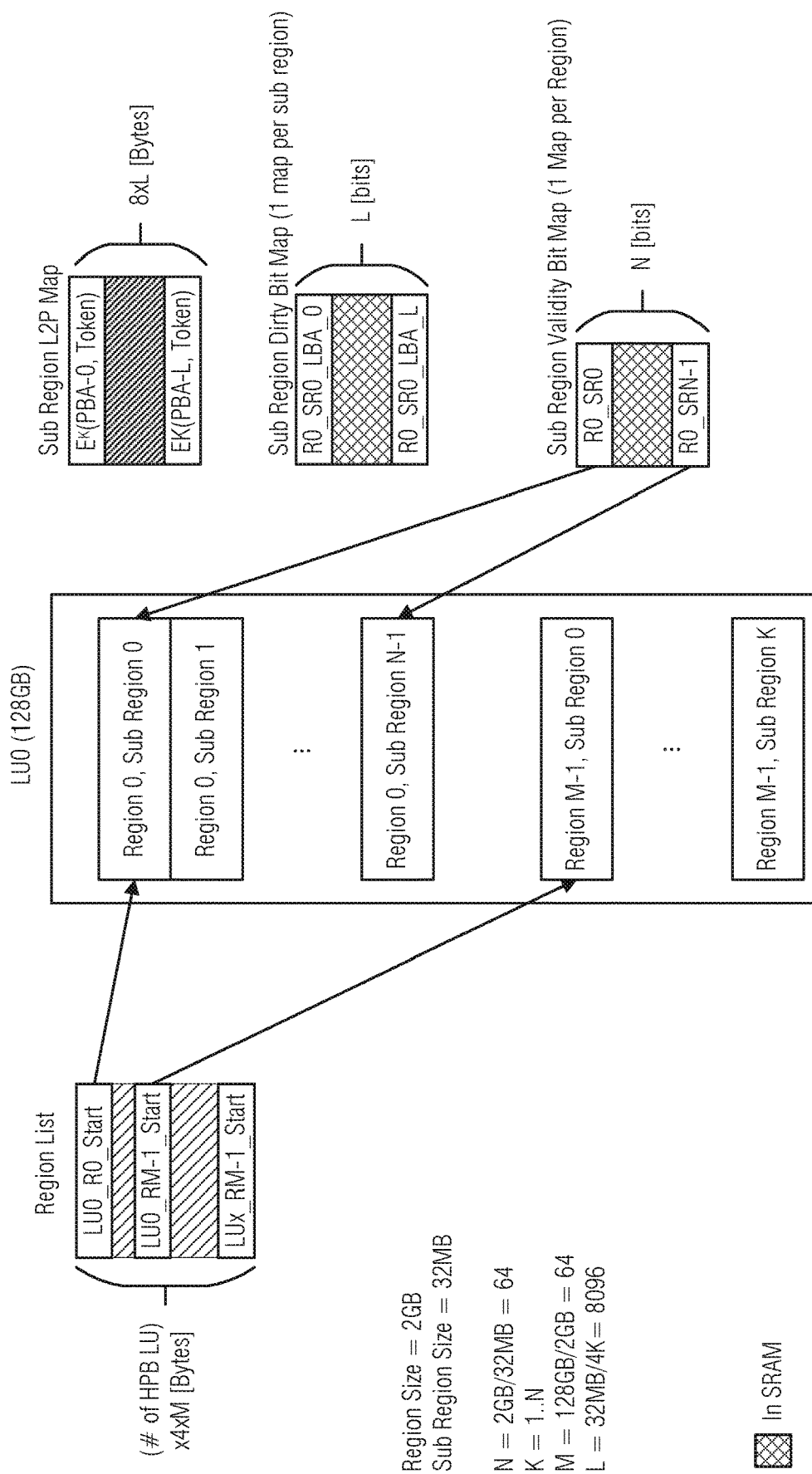
FIG. 7 illustrates an example of data structures to track obfuscated regions to update.

FIG. 7 illustrates an example of data structures to track obfuscated regions to update. The illustrated example gives some additional example sizes for a variety of features, such as the region and sub-region.

The region list is a structure that tracks regions that have maps that are, or should be, checked out to the host. The sub-region maps are stored in the non-volatile storage of the NAND array. The Sub Region Dirty Bitmap and the Sub Region Validity Map can also be stored in the NAND array.

The obfuscated L2P maps, when created (e.g., obfuscated or encrypted) are sent to the host to store in its working memory (e.g., DRAM). Tracking the sub-region validity is used for later syncing, for example, after waking from sleep. If the L2P maps are only a little bit invalid or dirty (e.g., below a threshold), they can still be useful for sending to the host and thus do not need to be regenerated. This can save some energy when the effect of keeping the obfuscated maps is minimal.

Figure 8:
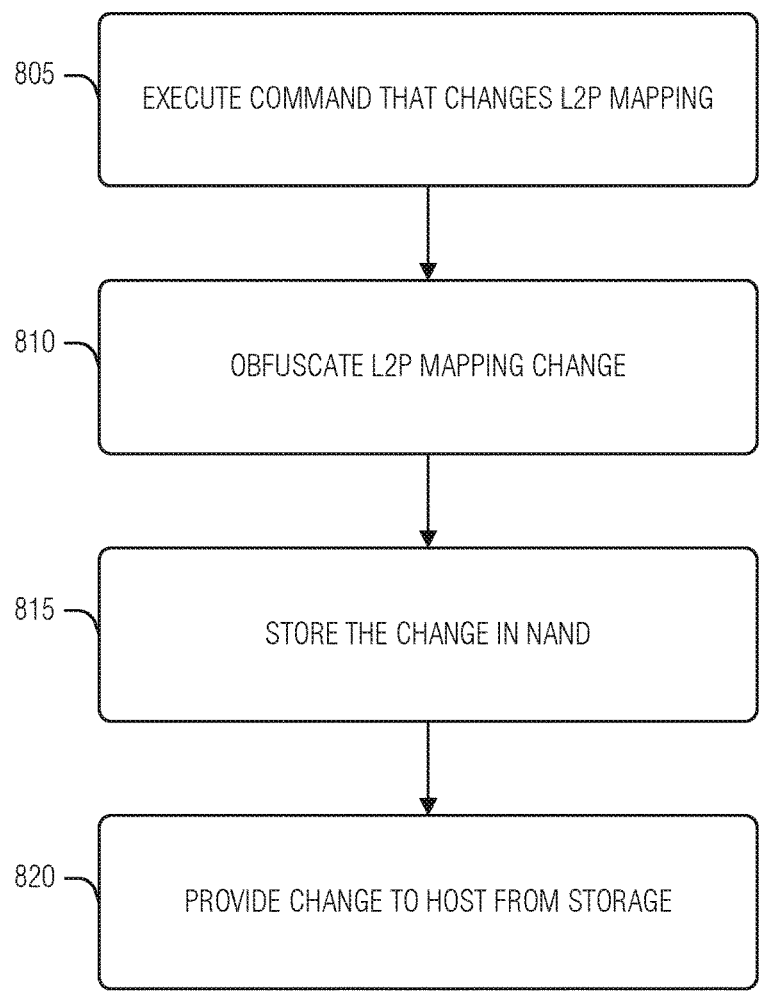
FIG. 8 illustrates a flowchart of an example of a method for efficient obfuscated logical-to-physical mapping.

FIG. 8 illustrates a flowchart of an example of a method 800 for efficient obfuscated logical-to-physical mapping. The operations of the method 800 are performed by computing hardware. An example of such computing hardware can include the memory controller 115 or other processing circuitry of the memory device 110 described above with respect to FIG. 1, other computer components, such as an external memory controller.

At operation 805, a command is executed that results in a change as to which physical address of a memory device corresponds to a logical address. As noted above, because NAND cells cannot generally be updated in place, most updates to the logical block for the logical address result in a change to the corresponding physical address.

At operation 810, the change is obfuscated as part of an obfuscated L2P table for the memory device. In an example, obfuscating the change includes updating a sub-region of a region of the obfuscated L2P table with the change and re-obfuscating the sub-region. In an example, a region is a segment of the obfuscated L2P table which the host can request in accordance with a communication protocol between the host and the memory device. In an example, a sub-region is a smallest number of bits that can be obfuscated by the memory device. For example, if the obfuscation is a block encryption with an eight-bit block, then the sub-region is an eight-bit segment of the region.

In an example, obfuscating the change (operation 810) is performed in response to an idle period of the memory device. In an example, obfuscating the change is performed in response to the change resulting in a sub-region of the obfuscated L2P table exceeding a threshold of changes. In an example, the method 800 is extended to include maintaining a map of valid or dirty bits to track changes to the sub-region. This map enables the NAND controller to evaluate metrics on how "dirty" the sub-region is. These metrics can then be used to prioritize sub-regions for updates during idle periods. By processing the dirtiest sub-regions first, the controller can achieve the greatest impact in terms of keeping the obfuscated L2P regions up-to-date with the idle time it has.

At operation 815, the change is written to storage on the memory device. Here, storage is the NAND array, or other non-volatile components of the memory device as opposed to an SRAM buffer used by the controller.

At operation 820, the change is provided to a host from the storage. Thus, instead of obfuscating the L2P table region on-the-fly, the controller simply serves up the pre-computed obfuscated region. In an example, the change is provided to the host is performed in response to a request from the host for L2P mappings. In an example, the change is provided to the host is performed in response to a host establishing communications with the memory device following a power-up of the host. This on-boot facility can greatly increase power-on responsiveness for the host, enabling more aggressive power-savings techniques for the host without impacting user experience.

In an example, the method 800 can be extended to include de-obfuscating a portion of the L2P table from the NAND array to volatile memory to perform an operation on the memory device. In an example, the operation perform by the controller is one of reading, writing, wear leveling, or garbage collection, wherein the memory device does not maintain a de-obfuscated version of the L2P table in the NAND array. Here, the obfuscated L2P table replaces a plaintext L2P table for NAND operations. This enables a reduction in the amount of storage consumed by the L2P table while still providing the benefit of pre-computed obfuscated L2P table regions. Further, because the obfuscated L2P table is used directly by the controller, it will be up-to-date without additional processing to synchronize a plaintext L2P table and an obfuscated L2P table.

Figure 9:
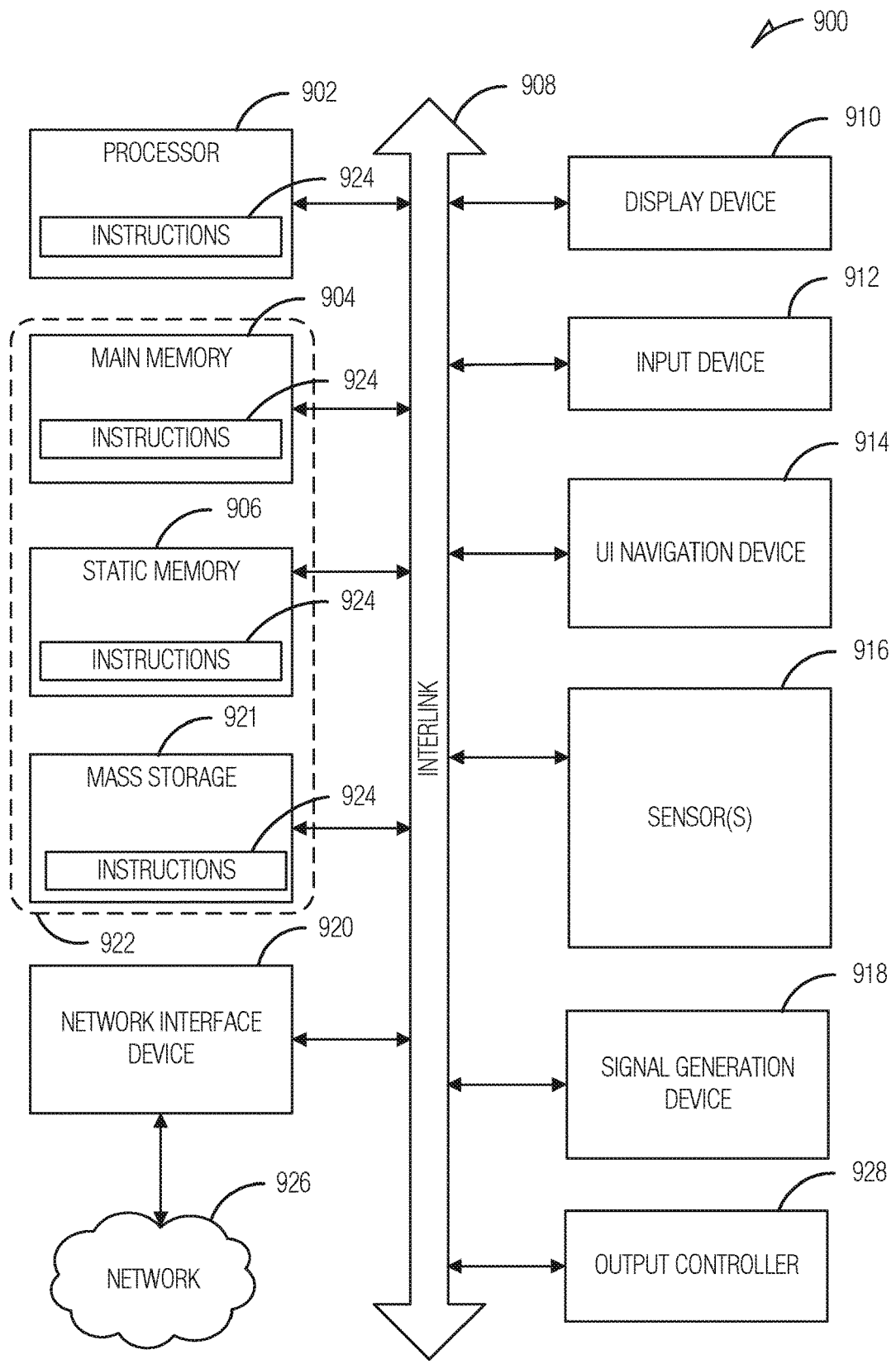
FIG. 9 is a block diagram illustrating an example of a machine upon which one or more embodiments can be implemented.

FIG. 9 illustrates a block diagram of an example machine 900 upon which any one or more of the techniques (e.g., methodologies) discussed herein can perform. In alternative embodiments, the machine 900 can operate as a standalone device or can be connected (e.g., networked) to other machines. In a networked deployment, the machine 900 can operate in the capacity of a server machine, a client machine, or both in server-client network environments. In an example, the machine 900 can act as a peer machine in peer-to-peer (P2P) (or other distributed) network environment. The machine 900 can be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, can include, or can operate by, logic, components, devices, packages, or mechanisms. Circuitry is a collection (e.g., set) of circuits implemented in tangible entities that include hardware (e.g., simple circuits, gates, logic, etc.). Circuitry membership can be flexible over time and underlying hardware variability. Circuitries include members that can, alone or in combination, perform specific tasks when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer readable medium is communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time.

The machine (e.g., computer system) 900 (e.g., the host device 105, the memory device 110, etc.) can include a hardware processor 902 (e.g., a central processing unit (CPU), a graphics processing unit (GPU), a hardware processor core, or any combination thereof, such as the memory controller 115, etc.), a main memory 904 and a static memory 906, some or all of which can communicate with each other via an interlink (e.g., bus) 908. The machine 900 can further include a display unit 910, an alphanumeric input device 912 (e.g., a keyboard), and a user interface (UI) navigation device 914 (e.g., a mouse). In an example, the display unit 910, input device 912 and UI navigation device 914 can be a touch screen display. The machine 900 can additionally include a storage device (e.g., drive unit) 921, a signal generation device 918 (e.g., a speaker), a network interface device 920, and one or more sensors 916, such as a global positioning system (GPS) sensor, compass, accelerometer, or other sensor. The machine 900 can include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 916 can include a machine readable medium 922 on which is stored one or more sets of data structures or instructions 924 (e.g., software) embodying or utilized by any one or more of the techniques or functions described herein. The instructions 924 can also reside, completely or at least partially, within the main memory 904, within static memory 906, or within the hardware processor 902 during execution thereof by the machine 900. In an example, one or any combination of the hardware processor 902, the main memory 904, the static memory 906, or the storage device 916 can constitute the machine readable medium 922.

While the machine readable medium 922 is illustrated as a single medium, the term "machine readable medium" can include a single medium or multiple media (e.g., a centralized or distributed database, or associated caches and servers) configured to store the one or more instructions 924.

The term "machine readable medium" can include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine readable medium examples can include solid-state memories, and optical and magnetic media. In an example, a massed machine readable medium comprises a machine-readable medium with a plurality of particles having invariant (e.g., rest) mass. Accordingly, massed machine-readable media are not transitory propagating signals. Specific examples of massed machine readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 (e.g., software, programs, an operating system (OS), etc.) or other data are stored on the storage device 921, can be accessed by the memory 904 for use by the processor 902. The memory 904 (e.g., DRAM) is typically fast, but volatile, and thus a different type of storage than the storage device 921 (e.g., an SSD), which is suitable for long-term storage, including while in an "off" condition. The instructions 924 or data in use by a user or the machine 900 are typically loaded in the memory 904 for use by the processor 902. When the memory 904 is full, virtual space from the storage device 921 can be allocated to supplement the memory 904; however, because the storage 921 device is typically slower than the memory 904, and write speeds are typically at least twice as slow as read speeds, use of virtual memory can greatly reduce user experience due to storage device latency (in contrast to the memory 904, e.g., DRAM). Further, use of the storage device 921 for virtual memory can greatly reduce the usable lifespan of the storage device 921.

In contrast to virtual memory, virtual memory compression (e.g., the Linux® kernel feature "ZRAM") uses part of the memory as compressed block storage to avoid paging to the storage device 921. Paging takes place in the compressed block until it is necessary to write such data to the storage device 921. Virtual memory compression increases the usable size of memory 904, while reducing wear on the storage device 921.

Storage devices optimized for mobile electronic devices, or mobile storage, traditionally include MMC solid-state storage devices (e.g., micro Secure Digital (microSD™) cards, etc.). MMC devices include a number of parallel interfaces (e.g., an 8-bit parallel interface) with a host device, and are often removable and separate components from the host device. In contrast, eMMC™ devices are attached to a circuit board and considered a component of the host device, with read speeds that rival serial ATA™ (Serial AT (Advanced Technology) Attachment, or SATA) based SSD devices. However, demand for mobile device performance continues to increase, such as to fully enable virtual or augmented-reality devices, utilize increasing networks speeds, etc. In response to this demand, storage devices have shifted from parallel to serial communication interfaces. Universal Flash Storage (UFS) devices, including controllers and firmware, communicate with a host device using a low-voltage differential signaling (LVDS) serial interface with dedicated read/write paths, further advancing greater read/write speeds.

The instructions 924 can further be transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 920 can include one or more physical jacks (e.g., Ethernet, coaxial, or phone jacks) or one or more antennas to connect to the communications network 926. In an example, the network interface device 920 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 900, and includes digital or analog communications signals or other intangible medium to facilitate communication of such software.

Additional Examples

Example 1 is a memory device that implements obfuscated logical-to-physical (L2P) mapping, the memory device comprising: processing circuitry; and storage that includes instructions, the instructions, when executed by the processing circuitry, configured the processing circuitry to: execute a command that results in a change as to which physical address of a memory device corresponds to a logical address; obfuscate the change as part of an obfuscated L2P map for the memory device; write the change to storage on the memory device; and provide the change to a host from the storage.

In Example 2, the subject matter of Example 1, wherein, to obfuscate the change as part of the obfuscated L2P map, the instructions configure the processing circuitry to: update a sub-region of a region of the obfuscated L2P map with the change; and re-obfuscate the sub-region.

In Example 3, the subject matter of Example 2, wherein a region is a segment of the obfuscated L2P map which the host can request in accordance with a communication protocol between the host and the memory device.

In Example 4, the subject matter of any of Examples 2-3, wherein a sub-region is a smallest number of bits that can be obfuscated by the memory device.

In Example 5, the subject matter of any of Examples 1-4, wherein the instructions configure the processing circuitry to provide the change to the host in response to a request from the host for L2P mappings.

In Example 6, the subject matter of any of Examples 1-5, wherein the instructions configure the processing circuitry to provide the change to the host in response to a host establishing communications with the memory device following a power-up of the host.

In Example 7, the subject matter of any of Examples 1-6, wherein the instructions configure the processing circuitry to de-obfuscate a portion of the L2P map from a non-volatile storage array to volatile memory to perform an operation on the memory device, the operation being one of reading, writing, wear leveling, or garbage collection, wherein the memory device does not maintain a de-obfuscated version of the L2P map in the non-volatile storage array.

In Example 8, the subject matter of any of Examples 1-7, wherein the instructions configure the processing circuitry to obfuscate the change in response to an idle period of the memory device.

In Example 9, the subject matter of Example 8, wherein the instructions configure the processing circuitry to obfuscate the change in response to the change resulting in a sub-region of the obfuscated L2P map exceeding a threshold of changes.

In Example 10, the subject matter of Example 9, wherein the instructions configure the processing circuitry to maintaining a map of valid or dirty bits to track changes to the sub-region.

Example 11 is a method for obfuscated logical-to-physical (L2P) mapping, the method comprising: executing a command that results in a change as to which physical address of a memory device corresponds to a logical address; obfuscating the change as part of an obfuscated L2P map for the memory device; writing the change to storage on the memory device; and providing the change to a host from the storage.

In Example 12, the subject matter of Example 11, wherein obfuscating the change as part of the obfuscated L2P map includes: updating a sub-region of a region of the obfuscated L2P map with the change; and re-obfuscating the sub-region.

In Example 13, the subject matter of Example 12, wherein a region is a segment of the obfuscated L2P map which the host can request in accordance with a communication protocol between the host and the memory device.

In Example 14, the subject matter of any of Examples 12-13, wherein a sub-region is a smallest number of bits that can be obfuscated by the memory device.

In Example 15, the subject matter of any of Examples 11-14, wherein providing the change to the host is performed in response to a request from the host for L2P mappings.

In Example 16, the subject matter of any of Examples 11-15, wherein providing the change to the host is performed in response to a host establishing communications with the memory device following a power-up of the host.

In Example 17, the subject matter of any of Examples 11-16, comprising de-obfuscating a portion of the L2P map from a non-volatile storage array to volatile memory to perform an operation on the memory device, the operation being one of reading, writing, wear leveling, or garbage collection, wherein the memory device does not maintain a de-obfuscated version of the L2P map in the non-volatile storage array.

In Example 18, the subject matter of any of Examples 11-17, wherein obfuscating the change is performed in response to an idle period of the memory device.

In Example 19, the subject matter of Example 18, wherein obfuscating the change is performed in response to the change resulting in a sub-region of the obfuscated L2P map exceeding a threshold of changes.

In Example 20, the subject matter of Example 19, comprising maintaining a map of valid or dirty bits to track changes to the sub-region.

Example 21 is a machine-readable medium including instructions to implement obfuscated logical-to-physical (L2P) mapping, the instructions, when executed by processing circuitry, cause the processing circuitry to perform operations comprising: executing a command that results in a change as to which physical address of a memory device corresponds to a logical address; obfuscating the change as part of an obfuscated L2P map for the memory device; writing the change to storage on the memory device; and providing the change to a host from the storage.

In Example 22, the subject matter of Example 21, wherein obfuscating the change as part of the obfuscated L2P map includes: updating a sub-region of a region of the obfuscated L2P map with the change; and re-obfuscating the sub-region.

In Example 23, the subject matter of Example 22, wherein a region is a segment of the obfuscated L2P map which the host can request in accordance with a communication protocol between the host and the memory device.

In Example 24, the subject matter of any of Examples 22-23, wherein a sub-region is a smallest number of bits that can be obfuscated by the memory device.

In Example 25, the subject matter of any of Examples 21-24, wherein providing the change to the host is performed in response to a request from the host for L2P mappings.

In Example 26, the subject matter of any of Examples 21-25, wherein providing the change to the host is performed in response to a host establishing communications with the memory device following a power-up of the host.

In Example 27, the subject matter of any of Examples 21-26, wherein the operations comprise de-obfuscating a portion of the L2P map from a non-volatile storage array to volatile memory to perform an operation on the memory device, the operation being one of reading, writing, wear leveling, or garbage collection, wherein the memory device does not maintain a de-obfuscated version of the L2P map in the non-volatile storage array.

In Example 28, the subject matter of any of Examples 21-27, wherein obfuscating the change is performed in response to an idle period of the memory device.

In Example 29, the subject matter of Example 28, wherein obfuscating the change is performed in response to the change resulting in a sub-region of the obfuscated L2P map exceeding a threshold of changes.

In Example 30, the subject matter of Example 29, wherein the operations comprise maintaining a map of valid or dirty bits to track changes to the sub-region.

Example 31 is a system for obfuscated logical-to-physical (L2P) mapping, the system comprising: means for executing a command that results in a change as to which physical address of a memory device corresponds to a logical address; means for obfuscating the change as part of an obfuscated L2P map for the memory device; means for writing the change to storage on the memory device; and means for providing the change to a host from the storage.

In Example 32, the subject matter of Example 31, wherein the means for obfuscating the change as part of the obfuscated L2P map include: means for updating a sub-region of a region of the obfuscated L2P map with the change; and means for re-obfuscating the sub-region.

In Example 33, the subject matter of Example 32, wherein a region is a segment of the obfuscated L2P map which the host can request in accordance with a communication protocol between the host and the memory device.

In Example 34, the subject matter of any of Examples 32-33, wherein a sub-region is a smallest number of bits that can be obfuscated by the memory device.

In Example 35, the subject matter of any of Examples 31-34, wherein the means for providing the change to the host performs in response to a request from the host for L2P mappings.

In Example 36, the subject matter of any of Examples 31-35, wherein the means for providing the change to the host performs in response to a host establishing communications with the memory device following a power-up of the host.

In Example 37, the subject matter of any of Examples 31-36, comprising means for de-obfuscating a portion of the L2P map from a non-volatile storage array to volatile memory to perform an operation on the memory device, the operation being one of reading, writing, wear leveling, or garbage collection, wherein the memory device does not maintain a de-obfuscated version of the L2P map in the non-volatile storage array.

In Example 38, the subject matter of any of Examples 31-37, wherein the means for obfuscating the change performs in response to an idle period of the memory device.

In Example 39, the subject matter of Example 38, wherein the means for obfuscating the change performs in response to the change resulting in a sub-region of the obfuscated L2P map exceeding a threshold of changes.

In Example 40, the subject matter of Example 39, comprising means for maintaining a map of valid or dirty bits to track changes to the sub-region.

Example 41 is at least one machine-readable medium including instructions that, when executed by processing circuitry, cause the processing circuitry to perform operations to implement of any of Examples 1-40.

Example 42 is an apparatus comprising means to implement of any of Examples 1-40.

Example 43 is a system to implement of any of Examples 1-40.

Example 44 is a method to implement of any of Examples 1-40.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" can include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

The term "horizontal" as used in this document is defined as a plane parallel to the conventional plane or surface of a substrate, such as that underlying a wafer or die, regardless of the actual orientation of the substrate at any point in time. The term "vertical" refers to a direction perpendicular to the horizontal as defined above. Prepositions, such as "on," "over," and "under" are defined with respect to the conventional plane or surface being on the top or exposed surface of the substrate, regardless of the orientation of the substrate; and while "on" is intended to suggest a direct contact of one structure relative to another structure which it lies "on" (in the absence of an express indication to the contrary); the terms "over" and "under" are expressly intended to identify a relative placement of structures (or layers, features, etc.), which expressly includes—but is not limited to—direct contact between the identified structures unless specifically identified as such. Similarly, the terms "over" and "under" are not limited to horizontal orientations, as a structure can be "over" a referenced structure if it is, at some point in time, an outermost portion of the construction under discussion, even if such structure extends vertically relative to the referenced structure, rather than in a horizontal orientation.

The terms "wafer" and "substrate" are used herein to refer generally to any structure on which integrated circuits are formed, and also to such structures during various stages of integrated circuit fabrication. The following detailed description is, therefore, not to be taken in a limiting sense, and the scope of the various embodiments is defined only by the appended claims, along with the full scope of equivalents to which such claims are entitled.

Various embodiments according to the present disclosure and described herein include memory utilizing a vertical structure of memory cells (e.g., NAND strings of memory cells). As used herein, directional adjectives will be taken relative a surface of a substrate upon which the memory cells are formed (i.e., a vertical structure will be taken as extending away from the substrate surface, a bottom end of the vertical structure will be taken as the end nearest the substrate surface and a top end of the vertical structure will be taken as the end farthest from the substrate surface).

As used herein, directional adjectives, such as horizontal, vertical, normal, parallel, perpendicular, etc., can refer to relative orientations, and are not intended to require strict adherence to specific geometric properties, unless otherwise noted. For example, as used herein, a vertical structure need not be strictly perpendicular to a surface of a substrate, but can instead be generally perpendicular to the surface of the substrate, and can form an acute angle with the surface of the substrate (e.g., between 60 and 120 degrees, etc.).

In some embodiments described herein, different doping configurations can be applied to a source-side select gate (SGS), a control gate (CG), and a drain-side select gate (SGD), each of which, in this example, can be formed of or at least include polysilicon, with the result such that these tiers (e.g., polysilicon, etc.) can have different etch rates when exposed to an etching solution. For example, in a process of forming a monolithic pillar in a 3D semiconductor device, the SGS and the CG can form recesses, while the SGD can remain less recessed or even not recessed. These doping configurations can thus enable selective etching into the distinct tiers (e.g., SGS, CG, and SGD) in the 3D semiconductor device by using an etching solution (e.g., tetramethylammonium hydroxide (TMCH)).

Operating a memory cell, as used herein, includes reading from, writing to, or erasing the memory cell. The operation of placing a memory cell in an intended state is referred to herein as "programming," and can include both writing to or erasing from the memory cell (e.g., the memory cell can be programmed to an erased state).

According to one or more embodiments of the present disclosure, a memory controller (e.g., a processor, controller, firmware, etc.) located internal or external to a memory device, is capable of determining (e.g., selecting, setting, adjusting, computing, changing, clearing, communicating, adapting, deriving, defining, utilizing, modifying, applying, etc.) a quantity of wear cycles, or a wear state (e.g., recording wear cycles, counting operations of the memory device as they occur, tracking the operations of the memory device it initiates, evaluating the memory device characteristics corresponding to a wear state, etc.)

According to one or more embodiments of the present disclosure, a memory access device can be configured to provide wear cycle information to the memory device with each memory operation. The memory device control circuitry (e.g., control logic) can be programmed to compensate for memory device performance changes corresponding to the wear cycle information. The memory device can receive the wear cycle information and determine one or more operating parameters (e.g., a value, characteristic) in response to the wear cycle information.

It will be understood that when an element is referred to as being "on," "connected to" or "coupled with" another element, it can be directly on, connected, or coupled with the other element or intervening elements can be present. In contrast, when an element is referred to as being "directly on," "directly connected to" or "directly coupled with" another element, there are no intervening elements or layers present. If two elements are shown in the drawings with a line connecting them, the two elements can be either be coupled, or directly coupled, unless otherwise indicated.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code can form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact discs and digital video disks), magnetic cassettes, memory cards or sticks, random access memories (RAMs), read only memories (ROMs), solid state drives (SSDs), Universal Flash Storage (UFS) device, embedded MMC (eMMC) device, and the like.

The above description is intended to be illustrative, and not restrictive. For example, the above-described examples (or one or more aspects thereof) can be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A memory device that implements obfuscated logical-to-physical (L2P) mapping, the memory device comprising:
   processing circuitry; and
   storage that includes instructions, the instructions, when executed by the processing circuitry, configured the processing circuitry to:
      execute a command that results in a change as to which physical address of a memory device corresponds to a logical address;
      obfuscate the change, as part of an obfuscated L2P map for the memory device, in response to the change resulting in a sub-region of the obfuscated L2P map exceeding a threshold of changes, the sub-region being smaller than a region of the obfuscated L2P map;
      write the change to storage on the memory device; and
      provide the change to a host from the storage.

2. The memory device of claim 1, wherein, to obfuscate the change as part of the obfuscated L2P map, the instructions configure the processing circuitry to:
   update a sub-region of a region of the obfuscated L2P map with the change; and
   re-obfuscate the sub-region.

3. The memory device of claim 2, wherein a region is a segment of the obfuscated L2P map which the host can request in accordance with a communication protocol between the host and the memory device.

4. The memory device of claim 2, wherein a sub-region is a smallest number of bits that can be obfuscated by the memory device.

5. The memory device of claim 1, wherein the instructions configure the processing circuitry to de-obfuscate a portion of the L2P map from a non-volatile storage array to volatile memory to perform an operation on the memory device, the operation being one of reading, writing, wear leveling, or garbage collection, wherein the memory device does not maintain a de-obfuscated version of the L2P map in the non-volatile storage array.

6. The memory device of claim 1, wherein the instructions configure the processing circuitry to maintaining a map of valid or dirty bits to track changes to the sub-region.

7. The memory device of claim 1, wherein the instructions configure the processing circuitry to provide the change to the host in response to a host establishing communications with the memory device following a power-up of the host.

8. The memory device of claim 1, wherein the instructions configure the processing circuitry to obfuscate the change in response to an idle period of the memory device.

9. A method for obfuscated logical-to-physical (L2P) mapping, the method comprising:
   executing a command that results in a change as to which physical address of a memory device corresponds to a logical address;
   obfuscating the change, as part of an obfuscated L2P map for the memory device, in response to the change resulting in a sub-region of the obfuscated L2P map exceeding a threshold of changes, the sub-region being smaller than a region of the obfuscated L2P map;
   writing the change to storage on the memory device; and
   providing the change to a host from the storage.

10. The method of claim 9, wherein obfuscating the change as part of the obfuscated L2P map includes:
    updating a sub-region of a region of the obfuscated L2P map with the change; and
    re-obfuscating the sub-region.

11. The method of claim 10, wherein a region is a segment of the obfuscated L2P map which the host can request in accordance with a communication protocol between the host and the memory device.

12. The method of claim 10, wherein a sub-region is a smallest number of bits that can be obfuscated by the memory device.

13. The method of claim 9, comprising de-obfuscating a portion of the L2P map from a non-volatile storage array to volatile memory to perform an operation on the memory device, the operation being one of reading, writing, wear leveling, or garbage collection, wherein the memory device does not maintain a de-obfuscated version of the L2P map in the non-volatile storage array.

14. The method of claim 9, comprising maintaining a map of valid or dirty bits to track changes to the sub-region.

15. The method of claim 9, wherein providing the change to the host is performed in response to a host establishing communications with the memory device following a power-up of the host.

16. The method of claim 9, wherein obfuscating the change is performed in response to an idle period of the memory device.

17. A non-transitory machine-readable medium including instructions to implement obfuscated logical-to-physical (L2P) mapping, the instructions, when executed by processing circuitry, cause the processing circuitry to perform operations comprising:
   executing a command that results in a change as to which physical address of a memory device corresponds to a logical address;
   obfuscating the change, as part of an obfuscated L2P map for the memory device, in response to the change resulting in a sub-region of the obfuscated L2P map exceeding a threshold of changes, the sub-region being smaller than a region of the obfuscated L2P map;
   writing the change to storage on the memory device; and
   providing the change to a host from the storage.

18. The non-transitory machine-readable medium of claim 17, wherein obfuscating the change as part of the obfuscated L2P map includes:
    updating a sub-region of a region of the obfuscated L2P map with the change; and
    re-obfuscating the sub-region.

19. The non-transitory machine-readable medium of claim 18, wherein a region is a segment of the obfuscated L2P map which the host can request in accordance with a communication protocol between the host and the memory device.

20. The non-transitory machine-readable medium of claim 18, wherein a sub-region is a smallest number of bits that can be obfuscated by the memory device.

21. The non-transitory machine-readable medium of claim 17, wherein the operations comprise de-obfuscating a portion of the L2P map from a non-volatile storage array to volatile memory to perform an operation on the memory device, the operation being one of reading, writing, wear leveling, or garbage collection, wherein the memory device does not maintain a de-obfuscated version of the L2P map in the non-volatile storage array.

22. The non-transitory machine-readable medium of claim 17, wherein the operations comprise maintaining a map of valid or dirty bits to track changes to the sub-region.

23. The non-transitory machine-readable medium of claim 17, wherein providing the change to the host is performed in response to a host establishing communications with the memory device following a power-up of the host.

24. The non-transitory machine-readable medium of claim 17, wherein obfuscating the change is performed in response to an idle period of the memory device.

* * * * *